United States Patent [19]

Boswell

[11] 4,106,853
[45] Aug. 15, 1978

[54] METHOD AND APPARATUS FOR INCREASING CONTRAST RATIO OF THE STORED IMAGE IN A STORAGE MODE LIGHT VALVE

[75] Inventor: Donald D. Boswell, Granada Hills, Calif.

[73] Assignee: Hughes Aircraft Company, Culver City, Calif.

[21] Appl. No.: 709,490

[22] Filed: Jul. 28, 1976

[51] Int. Cl.$^2$ .............................................. G02F 1/13
[52] U.S. Cl. ..................................... 350/333; 365/108
[58] Field of Search ................. 350/160 LC; 252/299, 252/408; 340/173 DR; 58/50 A

[56] References Cited

U.S. PATENT DOCUMENTS

| 3,652,148 | 3/1972 | Wysocki | 350/160 LC |
|---|---|---|---|
| 3,680,950 | 8/1972 | Haas | 350/160 LC |
| 3,806,230 | 4/1974 | Haas | 252/408 |
| 3,947,183 | 3/1976 | Haas | 350/160 LC |
| 3,976,361 | 8/1976 | Fraas | 350/160 LC |
| 3,991,416 | 11/1976 | Byles | 350/160 LC |
| 4,005,032 | 1/1977 | Haas | 252/299 |
| 4,009,934 | 3/1977 | Goodwin | 350/160 LC |

OTHER PUBLICATIONS

Wild, et al.; "Turn-On Time Reduction & Contrast Enhancement in Matrix-Addressed Liquid Crystal Light Valves"; Applied Physics Letters, vol. 19, No. 9, Nov. 1, 1971.

*Primary Examiner*—Verlin R. Pendegrass
*Assistant Examiner*—Donald P. Walsh
*Attorney, Agent, or Firm*—Lawrence V. Link, Jr.; W. H. MacAllister

[57] ABSTRACT

A method and apparatus for increasing the contrast ratio of the output image from a cholestericnematic (storage mode) light valve. The increase in contrast ratio is achieved by applying a low amplitude voltage across the cell at an erasing frequency thereby causing increased scattering of light in the stored image areas and decreased scattering in the clear area.

8 Claims, 4 Drawing Figures

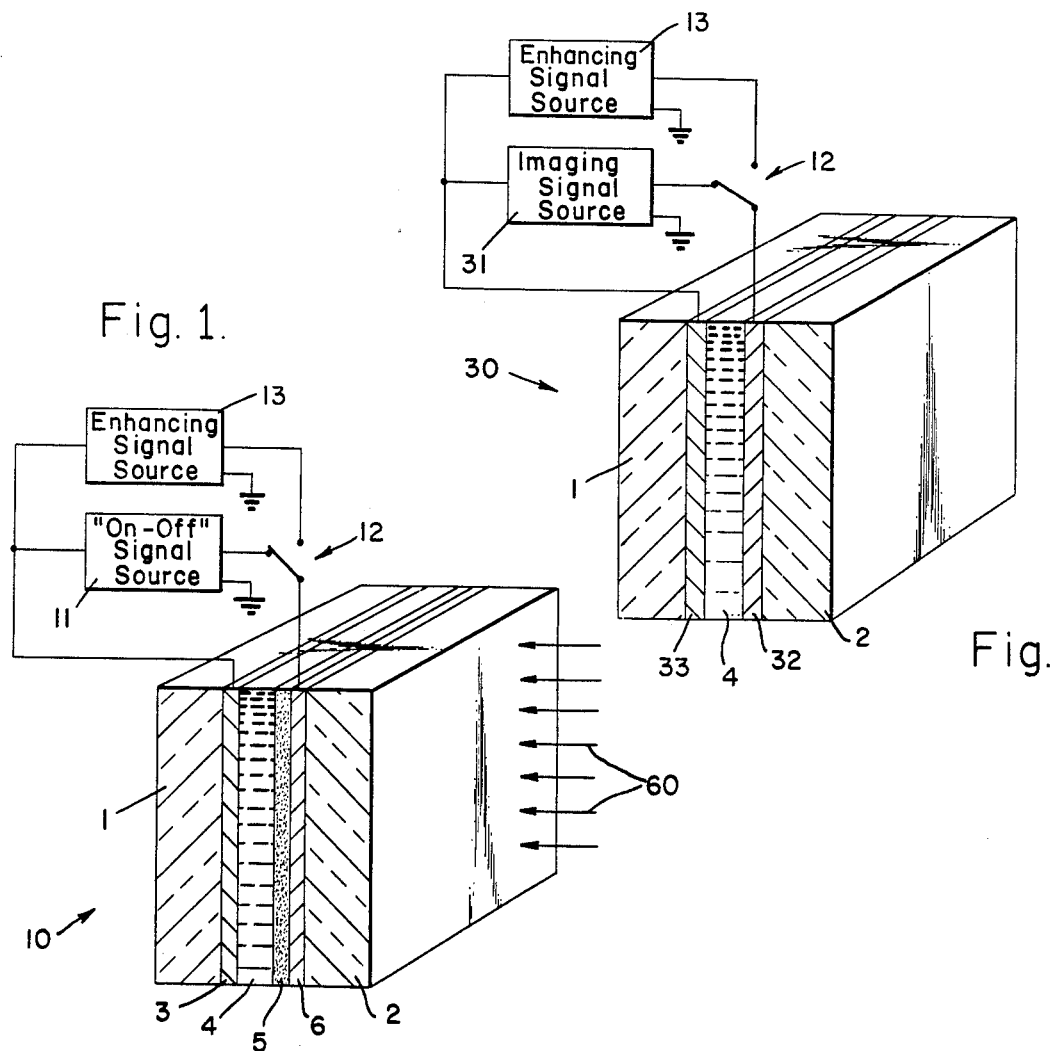
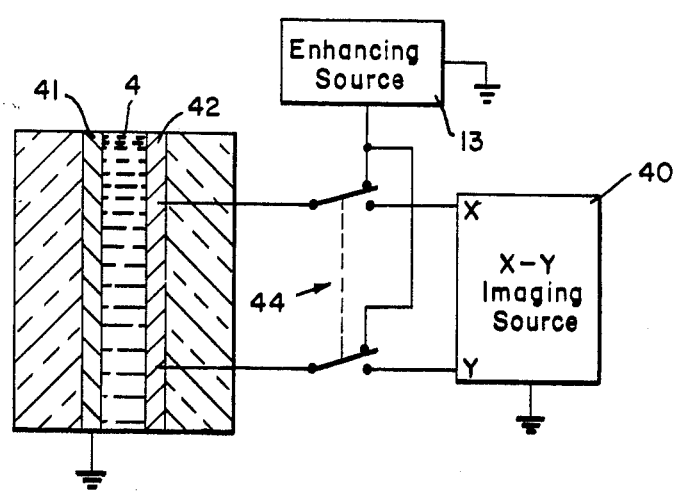

METHOD AND APPARATUS FOR INCREASING CONTRAST RATIO OF THE STORED IMAGE IN A STORAGE MODE LIGHT VALVE

BACKGROUND OF THE INVENTION

1. Field of the Invention

The present invention relates to methods and apparatus for increasing the contrast between the light scattering and non-light scattering regions in liquid crystal light valves and more particularly in liquid crystal light valves where the scattering is of the "emulsion scattering storage" (ESS) type.

2. Description of the Prior Art

Liquid crystal light valves whose light transmissivity in selected areas can be varied in response to a voltage, current, electric field, magnetic field, electron beam, a light beam or other external stimuli are well known. Such devices generally comprise a thin liquid crystal film or layer sandwiched between two plates at least one of which is transparent. A means is then provided for causing an image to be impressed on the liquid crystal by stimulating the liquid crystal film into its non-normal state. Generally, the normal state of a liquid crystal film is characterized by an ordering of the liquid crystal molecules in layers, columns or both layers and columns depending on whether the liquid crystal compound is of the smectic, nematic or cholesteric type respectively. Such an ordered state of the liquid crystal film is generally transparent. When the imaging stimulus is applied to the liquid crystal film, the molecules are induced into a non-ordered or "scattered" state. Since the regions where scattering occurs are generally translucent, an image can be impressed by the stimulation of selected regions of the liquid crystal cell.

Many liquid crystal materials are available for use in liquid crystal light valve devices. Devices using nematic type liquid crystals, for example, generally sustain light scattering only while the external stimulus is being applied, returning to the normal state within a relatively short time after the stimulus is removed. Scattering of this type is called "dynamic scattering."

In other types of liquid crystal materials, for example a nematic liquid crystal doped with about 10% cholesteric type liquid crystal, spontaneous return to the normal state either does not occur at all or occurs very slowly thus allowing retention of an image for a long period of time after the stimulus is removed.

Thus, it's clear that in storage-type liquid crystals not only must a stimulus be applied to cause a transition from a non-scattering to a scattering state, but an additional stimulus must be applied to cause the reverse transition from the scattering to the non-scattering state. The scattering in this type of liquid crystal device is called "emulsion scattering storage." It is this type of scattering to which the present invention is particularly applicable.

The method of stimulating storage-type liquid to crystals into emulsion scattering storage (ESS) by the application of an ac or dc field across the liquid crystal film is well known. The characteristics of the field required to induce transitions between the scattered and non-scattered state in storage-type liquid crystals are dependent upon the composition of the liquid crystal material and the geometric characteristic of the device. Thus, the application of a voltage across the cell having both a voltage amplitude above an amplitude threshold and a frequency below a maximum scattering frequency will cause a transition from the non-scattering to the scattering state. On the other hand, the application of a voltage across the cell having both a voltage amplitude above the amplitude threshold and a frequency greater than the maximum scattering frequency will cause erasing to begin to occur (i.e., transition from the scattered to the non-scattered state). Thus, in the present application the amplitude threshold refers to the dc or rms ac signal amplitude required to cause a transition from one scattering state to another, i.e., either to store an image or to erase a stored image. Further, the maximum scattering frequency the highest frequency at which scattering will occur in the liquid crystal if the voltage amplitude is above the amplitude threshold. A frequency below the maximum scattering frequency will cause scattering to occur while a frequency above the maximum scattering frequency will tend to cause erasure, i.e., restoration to the transparent state of the liquid crystal.

A representative imaging technique for transforming regions of the liquid crystal from the non-scattered to the scattered state utilizing such an ac signal is disclosed in U.S. Pat. No. 3,680,950. By contrast, in U.S. Pat. No. 3,642,348, a technique is disclosed which may be used to erase a stored image whereby transformation of specific portions of the liquid crystal from the Grandjean or scattered state to the focal-conic or non-scattered state is produced by the application of a second electric field.

Despite this ability to cause transitions between the scattered and non-scattered state in storage-type liquid crystals, a persistent problem has been the lack of sufficient contrast between the scattered and non-scattered regions resulting in difficulty in observing the image impressed on the liquid crystal film. Various techniques for increasing the contrast ratio between the scattered and non-scattered regions of a liquid crystal light valve have thus been devised. In U.S. Pat. No. 3,947,183, for example, a method of imaging is disclosed wherein increased contrast between the scattered and non-scattered regions is achieved by applying a scattering potential to the region desired to be scattered and applying an aligning electric field to the remainder of the liquid crystal area. However, this method requires complex addressing electronics to apply the appropriate electric field in the selected areas of the liquid crystal. In addition, the electric field is of the same strength as the imaging field. Another method of increasing contrast between scattered and non-scattered regions is disclosed in U.S. Pat. No. 3,652,148 wherein external means such as polarizers, edge lighting or optical filter systems are provided. Such means would require additional optical apparatus which would be cumbersome or otherwise unsuitable in many applications.

Thus, it is the general object of the present invention to provide a method by which the contrast between the scattering and non-scattering portions of a liquid crystal light valve is increased.

It is a further object of the present invention to provide a simplified, low power, method of increasing the contrast ratio in emulsive scattering storage liquid crystals.

It is yet another object of the present invention to provide a method to increase the contrast ratio without causing the image to be erased.

It is still another object of the present invention to provide an improved storage type liquid crystal device wherein a means is provided to increase the contrast ratio between the scattering and non-scattering regions.

SUMMARY OF THE INVENTION

The present invention provides an improved storage-type liquid crystal device having a storage-type liquid crystal layer and means for causing imaging wherein the improvement comprises providing a means for impressing a field across either the scattering or non-scattering regions of a liquid crystal device or across both regions simultaneously to increase the contrast between the scattering and transparent regions after the imaging signal or stimulus has been removed. The field may be generated by an enhancing signal source coupled to two electrodes, one on either side of the liquid crystal layer. The method of enhancing the contrast ratio comprises first impressing an image on the liquid crystal, second removing the means by which the image was impressed and finally applying an enhancing signal having an rms amplitude below the amplitude threshold of the liquid crystal film and having a frequency above the frequency threshold of the liquid crystal film.

A BRIEF DESCRIPTION OF THE DRAWINGS

A complete understanding of the present invention and of the above and other objects and advantages thereof may be gained from a consideration of the following description of the preferred embodiments taken in conjunction with the accompanying drawings in which:

FIG. 1 is a partial perspective partial schematic of a photoactivated storage type liquid crystal light valve with means for providing contrast enhancement.

FIG. 2 is a representation of a direct imaging system utilizing the liquid crystal light valve of FIG. 1.

FIG. 3 is a partial perspective partial schematic of a storage type liquid crystal light valve with means for providing contrast enhancement.

FIG. 4 is a partial schematic partial perspective of a storage type liquid crystal light valve having X-Y address imaging and contrast enhancement means.

DESCRIPTION OF THE PREFERRED EMBODIMENTS

Although the present apparatus and method may be applied to and practiced in liquid crystal devices utilizing any of the many types of imaging techniques applicable to storage type liquid crystal devices, the present invention may be most easily illustrated in its application to liquid crystal devices utilizing photoactivated imaging.

The photoactivated liquid crystal cell 10 depicted in FIG. 1 comprises a storage-type liquid crystal layer 4 sandwiched between a first transparent conductive electrode 3 adjoining or deposited on a first transparent plate 1, and a second transparent conductive electrode 6 adjoining or deposited on a second transparent plate 2, and a transparent photoconductor 5 between second conductive electrode 6 and liquid crystal layer 4. The on-off signal source 11 and enhancing signal source 13 are coupled to electrodes 3 and 6 so that imaging and enhancing signals may be selectively applied in response to the switching of switch 12.

In a representative embodiment, the electrodes 3 and 6 may be idium tin oxide (ITO), tin oxide or some other suitable transparent electrode and the transparent plates 1 and 2 may be glass or plastic. For the photoconductor, 5, zinc sulfide (ZnS), cadmium sulfide (CdS) or some other suitable material may be used. A CdS photoconductor film may be from about 1 micrometer to 12 micrometers in thickness, with 5 micrometers thick films performing best while the ZnS photoconductor films may vary from about 0.5 micrometers to 1 micrometer in thickness.

The liquid crystal material may be any one of a number of storage-type liquid crystals such as those disclosed by Haas et al, in U.S. Pat. No. 3,680,950, Wysocki et al in U.S. Pat. No. 3,642,348, or Wysocki et al in U.S. Pat. No. 3,652,148, so long as the liquid crystal remains in a scattering state, i.e., retains the image for a substantial period of time after the imaging impetus has been removed. As a more specific example, utilization of compounds comprising 8 to 10% cholesteric liquid crystal and 90 to 92% nematic dynamic scattering mode (DSM) type liquid crystals result in devices in which an applied imaging signal produce long term light-scattering, i.e., emulsion scattering storage. Smaller amounts of cholesteric additive give a fading emulsion scattering storage.

The liquid crystal film 4 may vary from 6 to 25 micrometers with a 12 micrometer thick film preferable. The aperture areas of typical cells are from 1 to 6 cm$^2$ but larger cells can be made with little difficulty.

The initial resistivity, the threshold field for scattering, the current levels, and power consumption, as well as the response time, amplitude, and decay time for scattering all vary with the composition (e.g., chemical structure and dopants) of the liquid crystal material used.

For imaging to occur in photoactivated liquid crystal cells such as that shown in FIG. 1, the electrical properties of the liquid crystal 4 and the photoconductor 5 must be properly matched so that the signal applied across electrodes 3 and 6 does not conduct current having a value above the amplitude threshold unless the photoconductor is optically activated. Thus, effective dark resistivity of the photoconductor layer must be higher than that of the liquid crystal layer, while its photoactivated resistivity should be lower than that of the liquid crystals. Other factors must also be matched. For example, the threshold voltage, the operating voltage and the operating current for effective scattering behavior must be consistent with the capabilities of the activated photoconductive layer. Also, the optical absorptance of the liquid crystal must not interfere with the photoactivation. Thus, if the imaging light passes through the liquid crystal before impinging upon the photoconductor, then the liquid crystal should not absorb appreciably at the activating wavelength. The liquid crystal layer, which may be in a non-scattered or transparent state, then changes state in response to an appropriate imaging signal from imaging signal source 11.

In operation, imaging signal source 11 supplies a signal which may be ac, dc, or a combination of ac and dc, to cause an image to be stored in the liquid crystal layer. For highest operating efficiency, it is preferable to apply an ac voltage superimposed on a dc bias where the dc bias supply voltage is typically from about 5 to 50 volts to supply a current density on the order of 1 to 10 $\mu A/cm^2$ with a like amount of ac.

Referring to FIG. 2, a simplified representation of a direct imaging scheme using a photoactivated liquid crystal light valve is shown comprising the liquid crystal cell 10 shown in FIG. 1, an imaging light source 20 for imposing an imaging light 60 on the liquid crystal cell 10, a display light source 21 and a screen 22 for projecting the image stored in the storage type liquid crystal light valve 10.

The thin photoconductive layer incorporated between the liquid crystal and one of the electrodes in a typical sandwich-type cell arrangement provide the means for creating the field necessary to cause scattering to occur. In FIG. 1, a signal is applied to the electrodes 3 and 6 but the high resistivity photoconductive layer 5 prevents current passing through the liquid crystal layer 4 from exceeding the amplitude threshold. However, when a spot on the photoconductive layer is activated optically by an imaging light 60 (e.g., by ultraviolet light), the voltage in the area of the activated spot becomes applied to the liquid crystal and immediately produces an image by causing emulsive scattering storage to occur just in this area. Cells with transparent electrodes, such as the one shown schematically in FIG. 1, can thus be placed directly in the image plane of a projection system as shown in FIG. 2.

For example, ultraviolet sensitive photoconductors, such as zinc sulfide, can be used so that the cells are not sensitive to visible light. Thus, an image can be recorded with ultraviolet light and viewed or displayed with visible light.

Once the image is stored on the liquid crystal film 4 and the switch 12 utilized to disconnect the imaging signal, contrast enhancement is accomplished by closing switch 12 to supply an enhancing signal from enhancing signal source 13 between conductive electrodes 3 and 6.

The method of increasing the contrast ratio thus comprises first impressing an image on a storage-type liquid crystal by any desired means such as the above-described photoactivation techniques. Once the image has been impressed and thus stored, enhancement of the contrast between the scattering and non-scattering regions, is achieved by applying an enhancing signal across the liquid crystal having an rms amplitude below the amplitude threshold of the particular liquid crystal material at frequency above the maximum scattering frequency and preferably in the audio frequency range. It will be appreciated that while the electrodes serve the dual function of imaging and enhancing, separate electrodes may be supplied to perform each function. Furthermore, while many amplitudes and frequencies may be used to cause an increase in contrast, an amplitude of approximately 10% of the amplitude threshold (about 10–15 volts rms) and a frequency of approximately twice the maximum scattering (approximately 10 khz) is preferable particularly in a liquid crystal light valve comprising 90–92% nematic liquid crystal and 8–10% cholesteric liquid crystal.

The contrast enhancement will continue as long as the enhancing signal is impressed across the liquid crystal film 4 and operates to increase both the opacity in the scattering regions and the transparency in the non-scattering regions. While maximum enhancement will thus occur when the enhancing field is applied to both scattering and non-scattering portions of the liquid crystal light valve, it will be appreciated, that the contrast enhancement signal may be impressed on only selected portions of the liquid crystal by limiting the size or configuration of the enhancement electrodes or the areas in which the liquid crystal material is placed in electric field relationship to the enhancement electrodes.

Although the above description of the present invention has been illustrated as it applies to a photoactivated liquid crystal light valve, the present invention applies to storage type liquid crystals utilizing other imaging techniques as well.

Referring to FIG. 3, for example, a simple storage-type light valve structure 30 for regulating the passage of light is shown comprising transparent plates 1 and 2, liquid crystal layer 4, enhancement electrodes 32 and 33 (which also serve as imaging electrodes), "imaging" signal source 31 and enhancing signal source 13. An appropriate signal from the "imaging" signal source 31 applied across electrodes 33 and 32 induces a transition between the scattering and non-scattering state. The transparency or the opacity may then be enhanced after the "imaging" signal is removed to more effectively regulate the passage of light by applying an appropriate contrast enhancing signal from enhancing signal source 13.

In FIG. 4, another liquid crystal light valve is shown having a X-Y addressable imaging scheme wherein a field may be generated between electrodes 41 and 42 in response to an imaging signal selectively applied to the X-Y address grid electrodes 42 by X-Y imaging source 40. Thus, selected regions of the liquid crystal layer 4 may be transformed between the scattered and non-scattered state. When the imaging signal from X-Y imaging source is removed, the image remains since the liquid crystal film is a storage-type liquid crystal. To enhance the contrast of the stored image, the enhancing signal source 13 supplies, via the closing of switch 44 for example, an appropriate enhancing signal to all X-Y address lines simultaneously to achieve contrast enhancement over the entire liquid crystal surface. Of course, the enhancing signal may be applied to only a selected few of the X-Y address lines to enhance selected portions of the liquid crystal device by simply adding appropriate addressing means for the enhancing source 13.

It will be appreciated that other imaging schemes may be utilized to practice the present invention so long as an enhancing signal having the appropriate amplitude and frequency is utilized to impress a field across the liquid crystal layer. It will also be appreciated that the imaging liquid crystal device may be reflective or transmissive without departing from the spirit of the present invention. Finally, the enhancing electrodes may serve the dual function of imaging and enhancing or may be separate electrodes.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

What is claimed is:

1. An improved storage-type liquid crystal cell comprising a storage-type liquid crystal layer and imaging means for causing emulsive scattering storage in selected regions of the liquid crystal cell, the improvement comprising means for applying a signal across selected regions of the liquid crystal layer said signal having an rms amplitude below the amplitude threshold and a frequency above the maximum scattering frequency of the storage-type liquid crystal layer.

2. The storage-type liquid crystal cell of claim 1 wherein said means for applying said signal comprises:
   (a) a first electrode interposed on one side of the liquid crystal layer;

(b) a second electrode interposed on the opposite side of the liquid crystal layer said first and second electrodes in electric field influencing relationship with said liquid crystal layer; and (c) an enhancing signal source coupled between said first and second electrodes to provide a contrast enhancing signal between said first and second electrodes in said liquid crystal cell.

3. A method for increasing the opacity and transparency in the scattered and non-scattered regions of a storage type liquid crystal cell of the type having a liquid crystal layer comprising the steps of:

(a) impressing an image on said liquid crystal cell with an imaging means;

(b) deactivating said imaging means; and (c) applying an enhancing signal across the liquid crystal cell said signal having a rms amplitude below the amplitude threshold of the liquid crystal layer and having a frequency above the maximum scattering frequency of the liquid crystal layer.

4. The method of claim 3 wherein the enhancing signal amplitude is about 10% of the amplitude threshold voltage.

5. The method of claim 3 wherein the enhancing signal is about 10 to 15 volts rms.

6. The method of claim 3 wherein the enhancing signal has a frequency in the audio frequency range.

7. The method of claim 3 wherein the enhancing signal has a frequency about twice that of the maximum scattering frequency.

8. The method of claim 3 wherein the enhancing signal has a frequency of approximately 10 khz.

* * * * *